United States Patent [19]

Serini et al.

[11] Patent Number: 4,463,130

[45] Date of Patent: Jul. 31, 1984

[54] FLAME-RESISTANT POLYMER MIXTURES

[75] Inventors: Volker Serini, Krefeld; Horst Peters, Leverkusen; Udo Rudolph, Krefeld; Josef Buekers, Krefeld; Nouvertné, Krefeld; Dieter Freitag, Krefeld, all of Fed. Rep. of Germany

[73] Assignee: Bayer Aktiengesellschaft, Leverkusen, Fed. Rep. of Germany

[21] Appl. No.: 528,259

[22] Filed: Aug. 31, 1983

[30] Foreign Application Priority Data

Sep. 10, 1982 [DE] Fed. Rep. of Germany ....... 3233614

[51] Int. Cl.$^3$ .................. C08L 51/04; C08L 69/00
[52] U.S. Cl. ..................... 525/67; 524/504; 524/508; 525/132; 525/146; 525/147
[58] Field of Search .................. 525/67, 146, 147; 524/504, 508

[56] References Cited

U.S. PATENT DOCUMENTS 3,737,486  6/1973  Schutze et al. .......... 524/125
4,246,169  1/1981  Norris et al. .......... 524/127

FOREIGN PATENT DOCUMENTS 2800923  7/1978  Fed. Rep. of Germany .

*Primary Examiner*—Theodore E. Pertilla
*Attorney, Agent, or Firm*—Connolly and Hutz

[57] ABSTRACT

This invention relates to flame-resistant polymer mixtures of polycarbonate, styrene polymer and/or graft polymer and polyphosphate, which mixtures may contain organic chlorine and bromine compounds and polytetrafluoroethylene used for the production of moulded articles such as electrical housings, electrical insulators, and for moulded automobile parts such as coverings, dashboards and so forth.

1 Claim, No Drawings

FLAME-RESISTANT POLYMER MIXTURES

This invention relates to flame-resistant polymer mixtures of polycarbonate, styrene polymer and/or graft polymer and polyphosphate, which mixtures may contain organic chlorine and bromine compounds and polytetrafluoroethylene.

The flame-resistant polymer mixtures according to the present invention are characterised in that they contain (a) from 5 to 94% by weight of a polycarbonate, the linear chains of which consist of at least 85 mol % of recurring structural units corresponding to formula (1):

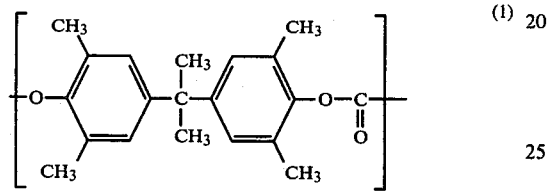

and
at most 15 mol % of recurring units corresponding to formula (2):

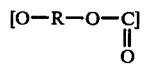

wherein
—R— represents an o—, m— or p-phenylene radical or a radical of the formula (2a)

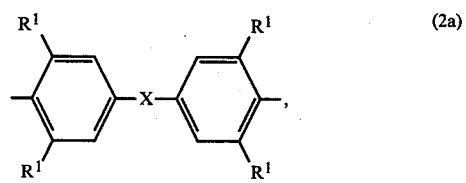

wherein
$R^1$ represents hydrogen, halogen such as chlorine or bromine and $C_1$-$C_3$-alkyl and
X represents a $C_1$-$C_5$ alkylene- or alkylidene radical, a $C_3$-$C_6$ cycloalkylene or cycloalkylidene radical, a single bond, —S— or a radical of the formula (2b),

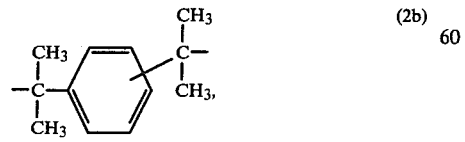

in which the two alkyl-substitutents can have o—, m— or -position to each other, or represents a radical of the formula (2c)

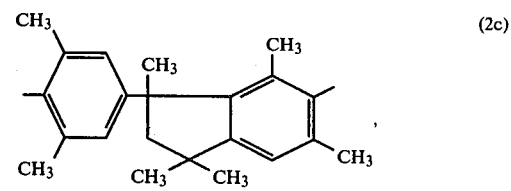

whereby units of the formula (1) are not comprised, (b) from 94 to 5% by weight of a styrene polymer and/or a graft polymer, (c) from 1 to 35% by weight of a branched polyphosphate which consists of at least 1 mol % of recurring structural units corresponding to the formulae (3) and/or (4):

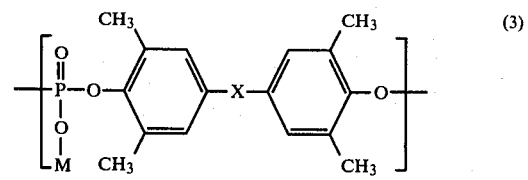

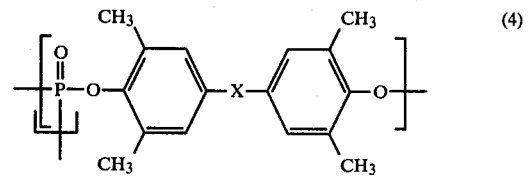

wherein
X represents a $C_1$-$C_5$ alkylene or alkylidene radical, a $C_5$-$C_6$ cycloalkylene or cycloalkylidene radical, a single bond, —S— or

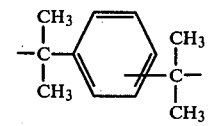

and
M represents H, alkali metal as Li, Na, K, ½ alkaline earth metal as Mg, Ca, Ba, Y or —R—OH, wherein
Y represents an alkyl-, cycloalkyl-, aryl- or aralkyl-radical and
R is as defined above,
and at most 99 mol % of recurring structural units corresponding to formulae (5) and/or (6):

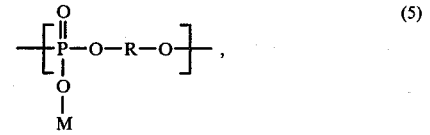

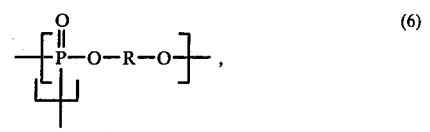

wherein

R and M are as defined above, but not including units corresponding to formulae (3) and (4), (d) from 0 to 20% by weight of one or more organic chlorine and/or bromine compounds which contain only aromatically bound chlorine and/or bromine, have a decomposition temperature above 250° C. and do not boil under normal pressure up to at least 300° C., and (e) from 0 to 1% by weight of polytetrafluoroethylene.

The polycarbonate mentioned under (a) is either a copolycarbonate having at least 85 mol % of recurring structural units corresponding to formula (1) and at the most 15 mol % of recurring structural units corresponding to formula (2), or a polycarbonate only of recurring structural units corresponding to formula (1).

The structural units corresponding to formula (1) are based on 2,2-bis-(3,5-dimethyl-4-hydroxyphenyl)propane. The structural units corresponding to formula (2) may be based on all other aromatic diols, in which the two hydroxy groups are of a phenolic nature. Therefore, they must have at least one aromatic nucleus. Examples of such aromatic diols include the following: hydroquinone, resorcinol, dihydroxydiphenyls, bis-(hydroxyphenyl)-alkanes, bis-(hydroxyphenyl)-cycloalkanes, bis-(hydrophenyl)-sulphides, bis-(hydroxyphenyl)-ethers, bis-(hydroxyphenyl)-sulphones, $\alpha,\alpha'$-bis-(hydroxyphenyl)-diisopropylbenzenes and nuclear-alkylated and nuclear-halogenated derivatives thereof.

These and other suitable aromatic dihydroxy compounds are described in, for example U.S. Pat. Nos. 3,028,365; 2,999,835; 3,148,172; 3,271,368; 2,991,273; 3,271,367; 3,780,078; 3,014,891; 2,999,846; in DE-OS 2,063,050; 2,211,957; 1,570,703; 2,329,585; 2,329,646 and in the monograph "Hermann Schnell, Chemistry and Physics of Polycarbonates, Polymer Reviews, Volume 9, Interscience Publishers, New York, 1964".

Preferred polycarbonates include those which are based on crude bisphenols, as they may be produced from pure 2,6-dimethylphenol and in particular from commercial 2,6-dimethylphenols contaminated with cresols, according to the processes of DE-OS No. 2,928,464 and DE-OS No. 2,928,443. They must contain at least 85% by weight of the recurring structural units corresponding to formula (1).

Preferred copolycarbonates which have recurring structural units corresponding to formula (1) contain at least 90% by weight of these structural units. Polycarbonates which exclusively contain recurring structural units corresponding to formula (1) are most particularly preferred.

The polycarbonates which may be used according to the present invention are produced by known processes, for example according to the processes of DE-OS Nos. 2,063,050; 2,211,957; 2,901,665 and 2,901,668. These polycarbonates have molecular weights $\overline{M}_w$ (weight average) of from 10,000 to 200,000, preferably from 20,000 to 80,000, more preferably from 25,000 to 60,000 and most preferably from 30,000 to 45,000.

Chain terminators may be used in conventional quantities for adjusting the required molecular weights $\overline{M}_w$ of the aromatic polycarbonates which may be used according to the present invention. Suitable chain terminators include, for example, phenols, such as phenol, o, m, p-cresol, 2,6-dimethylphenol, p-tertiarybutylphenol and p-isooctylphenol.

The polycarbonates which may be used according to this invention may be branched. Branching is achieved by the incorporation of small quantities, preferably quantities of from 0.05 to 2.0 mol % (based on the diphenols used), of tri- or more than tri-functional compounds. Compounds which have three or more phenolic hydroxy groups are preferably used as tri-functional compounds. The production of this type of branched polycarbonates is described in, for example, DE-OS Nos. 1,570,533; 1,596,762; 2,116,974; 2,113,347; GB-PS Nos. 1,079,821 and 1,476,108 and in U.S. Pat. No. 3,544,514.

Styrene polymers within the context of the present invention are homo- and copolymers of styrenes, acryl and methacryl compounds and maleic acid anhydride which generally consist of at least 10% by weight, preferably at least 40% by weight, and more preferably at least 60% by weight of one or more styrenes.

The term "styrenes" is understood as designating styrene and derivatives thereof, for example styrene, $\alpha$-methylstyrene, p-methylstyrene, $\alpha$-chlorostyrene and p-chlorostyrene. Styrene and $\alpha$-methylstyrene are preferred, and styrene is particularly preferred.

Furthermore, acrylic and methacrylic acid and alkyl esters thereof, for example methyl, ethyl, propyl, butyl and octyl ester, nitriles thereof such as acrylonitrile and methacrylonitrile are used. Acrylonitrile and methyl methacrylate are preferred.

Preferred styrene polymers include polystyrene, styrene-acrylonitrile copolymers, in particular styrene-acrylonitrile copolymers having acrylonitrile contents of from 1.5 to 15% by weight, styrene-methyl methacrylate copolymers and styrene-maleic acid anhydride copolymers.

Graft polymers within the present context are rubber-containing polymers which may be obtained according to known processes by the graft-copolymerisation of one or more of the above-mentioned monomers on a rubber, for example diene rubber, ethylene-propylenediene rubber or acrylate rubber.

The term "diene rubbers" is understood as designating homopolymers of conjugated dienes having from 4 to 8 carbon atoms, for example butadiene, isoprene and chloroprene, copolymers of such dienes with each other and copolymers of such dienes with other monomers, in particular with up to 50% by weight of the above-mentioned monomers. Diene rubbers of this type include, for example: polybutadiene, polyisoprene, butadiene-styrene copolymers, butadiene-acrylonitrile copolymers, butadiene-methyl methacrylate copolymers and butadiene-acrylic acid butyl ester copolymers. Ethylene-propylene-diene rubbers include, for example, those rubbers which contain hexadiene-1,5-norbornadiene or ethylidiene norbornene as the diene. Acrylate rubbers include, for example, cross-linked or non-cross-linked polymers of acrylic acid alkyl esters, optionally with up to 40% by weight of other polymerisable ethylenically unsaturated monomers. Acrylic acid alkyl esters preferably include $C_1-C_8$ alkyl esters, for example methyl, ethyl, butyl and octyl esters, in particular the butyl esters. Acrylate rubbers are described in, for example, DE-OS No. 31 18 861.3.

The branched polyphosphates which are used according to the present invention as mixture components are produced by the reaction of aromatic diols with phosphoric acid esters in the presence of basic catalysts, such as alkaline earth metal or alkali metal compounds.

The aromatic diols are generally reacted with phosphoric acid esters as follows. The phosphoric acid ester is introduced and melted if it is not already liquid, but solid. The aromatic diol is added to the phosphoric acid ester and dissolved with heating. The catalyst is then added. The release of alcohol or phenol then starts at an elevated temperature with the formation of the polyphosphates. The alcohol or phenol which is released is distilled off. The resulting branched polyphosphate remains.

The process is carried out analogously if several aromatic diols or several phosphoric acid esters are used. The addition sequence of the starting components may differ from that described above. Solubility of the components in each other is also not strictly necessary for the reaction, even if it is favourable. The time of addition of the catalyst once the starting components have been melted is not critical. The addition may be made before or during the melting of the starting components. It may also be useful to subsequently add catalyst during the reaction to maintain an adequate reaction rate. The catalyst does not need to be dissolved, or does not need to be completely dissolved in the reaction mixture, although this may be favourable for the reaction and for the quality of the product which is obtained.

The starting components are generally melted at a temperature of from 50° to 300° C., preferably from 100° to 250° C., and more preferably from 125° to 225° C. The catalyst is preferably added once the starting components have been melted. It is particularly favourable for the start and the continuation of the reaction if the catalyst is added at a temperature of from 100° to 250° C., preferably from 125° to 225° C.

The reaction temperature is maintained as low as possible. It generally ranges from 100° to 350° C., preferably from 125° to 300° C., and more preferably from 150° to 250° C. In the starting phase in which most of the alcohol or most of the phenol (about 90%) is released, the reaction temperature is as low as possible, preferably from 100° to 250° C., and more preferably from 125° to 225° C.

Polycondensation advantageously takes place under reduced pressure, because as a result of this, the alcohol or the phenol is rapidly removed from the reaction mixture. The process is generally carried out under pressures of from 600 to 0.01 mm Hg, preferably under pressures of from 400 to 0.025 mm Hg, and more preferably under pressures of from 250 to 0.05 mm Hg.

Whereas most of the alcohol or most of the phenol (about 90%) is generally released under 600 to 10 mm Hg, the residual quantities are distilled off under 10 to 0.01 mm Hg. A pressure balance which may become necessary is achieved using inert gas, for example using $CO_2$ or $N_2$, so that atmospheric oxygen is substantially kept away from the reaction medium. The reactants are also generally melted under inert gas.

The residual content of released alcohol or phenol in the polyphosphate generally amounts to less than 2%, preferably less than 1%, more preferably less than 0.5% and most preferably less than 0.1% by weight, based on the polyphosphate which is obtained.

The minimum quantity of catalyst to be used depends on the type of aromatic diols. Whereas, when predominantly aromatic diols based on the formulae (3) and (4) are used, relatively large quantities of catalyst are to be used, when aromatic diols based on the formulae (5) and (6) are used, these quantities may often be reduced. During the reaction of the aromatic diols on which the formulae (3)–(6) are based with phosphates, from 1.0 to 0.0001, preferably from 0.5 to 0.0005, and more preferably from 0.05–0.0005 mols of alkali metal or alkaline earth metal/mol of phosphate are generally used. The expression "alkali metal" or "alkaline earth metal" relates to the elements, for example Li, Na, K, Ca and Ba in the basic alkali or alkaline earth metal compounds. When large quantities of alkali or alkaline earth metal are used, the polycondensation is to be commenced at a particularly low temperature and under only slightly reduced pressure owing to the faster rate of release of the alcohols or phenols.

The polyphosphates contain ionic groups, which can be formed by the reaction of terminal OH-groups with basic compounds, e.g. by the reaction with the alkali- or alkaline-earth compounds used as catalysts, so that salts, e.g. $-O^{\ominus}m^{\oplus}$, $-O^{\ominus} \tfrac{1}{2}M^{\oplus\oplus}$ ($M^{\oplus}$=alkali metal ion,[e.g. $Li^{\oplus}$, $Na^{\oplus}$, $K^{\oplus}$], $M^{\oplus\oplus}$ alkaline earth metal ion [e.g. $Ca^{\oplus\oplus}$, $Ba^{\oplus\oplus}$]), are formed.

During the production of the polyphosphates which may be used according to the present invention, the aromatic diols and the monomeric phosphates are used in a ratio of from 0.66:1 to 2.3:1 molar parts. Ratios of from 0.66:1–0.96:1 and from 2.3:1–1.6:1 are preferred, whereas ratios of from 0.75:1–0.96:1 and from 2.2:1–1.6:1 are more preferred, and ratios of from 0.8:1–0.92:1 and from 2.1:1–1.7:1 are most preferred.

The polyphosphates which may be used according to the present invention consist of polymer units corresponding to the formulae (7) and/or (8) and optionally (9):

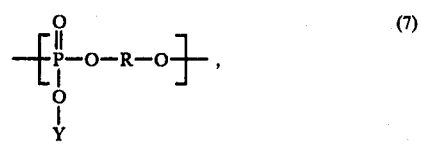

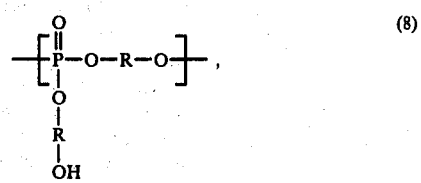

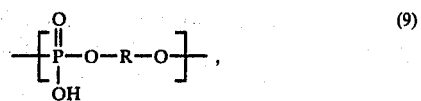

and contain branching points corresponding to formula (10)

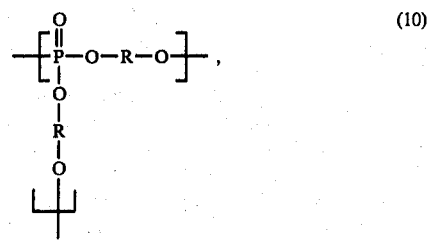

and terminal groups corresponding to formulae (11), (12), (13) and optionally corresponding to the formulae (14), (15) and (16):

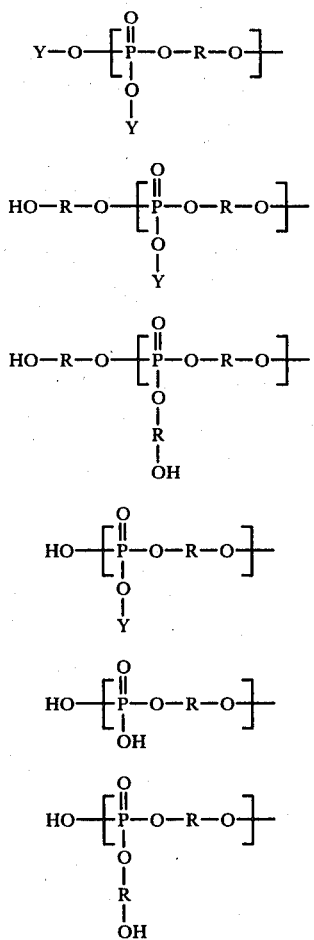

In the formulae (7) and (16), Y and —R— are as defined in formulae (2) and (3).

The polymer units corresponding to formula (9) and the terminal groups corresponding to formulae (14), (15) and (16) may be present, for example, if alkali metal hydroxides are used as catalysts, or if moisture is not excluded or even if small quantities of H$_2$O are added.

The polyphosphates which may be used according to this invention generally contain, in addition to the structural units corresponding to the formulae (8), (9), (12), (13), (14), (15) and (16) which contain OH groups, structural units which are analogous thereto, but which contain ionic groups —O$^{\ominus}$Me$^{\oplus}$ or —O$^{\oplus}$Me$^{\oplus\oplus}$O—, instead of the OH groups.

Me$^{\oplus}$ represents, for example, alkali metal ions, such as Li$^{\oplus}$, Na$^{\oplus}$, K$^{\oplus}$ and Me$^{\oplus\oplus}$ represents, for example, alkaline earth metal ions such as Ca$^{\oplus\oplus}$ and Ba$^{\oplus\oplus}$. The quantity of these ionogenic groups depends on the quantity of catalyst which is used. Branched polyphosphates are generally preferred which contain ionic groups corresponding to the quantity of catalyst which is preferably used. However, in particular cases, it may be desirable to bring the content of ionic groups to a particularly high or a particularly low level. In the first case, particularly large quantities of catalyst are used during polycondensation, whereas in the second case, particularly low quantities of catalyst are used.

The addition of base-binding substances may also influence the content of ionic groups and reduce said content. Such base-binding substances include, for example, dialkyl sulphates, such as dimethyl sulphate, diethyl sulphate or organic acids, such as toluene sulphonic acid. These compounds are generally added to the polymer melt in the required quantity towards the end of polycondensation. Thereafter, time is allowed for the reaction of these substances with the ionomeric groups before the end of condensation.

The ratios of the quantity of different structural units corresponding to formulae (7) to (16) in the polyphosphate may be influenced by adjusting specific molar ratios of aromatic diol:phosphate during the polyphosphate synthesis.

These ratios may be of major significance for the respective purpose of use of the polyphosphate. Thus, in the case of the molar ratios of aromatic diol:phosphate of 0.66:1–1.49:1, the structural units corresponding to formulae (7) and (11) generally predominate with respect to the structural units corresponding to formulae (8) and (13), whereas in the case of molar ratios of aromatic diol:phosphate of 1.51–2.3:1, the structural units corresponding to formulae (8) and (13) predominate with respect to the structural units corresponding to formulae (7) and (11).

In the case of the preferred molar ratios of aromatic diol:phosphate of 0.66:1–0.96:1, of the structural units corresponding to the formulae (7), (8), (11), (12) and (13), practically only structural units corresponding to the formulae (7) and (11) may be obtained in the polyphosphate, and in the case of the preferred molar ratios of aromatic diol:phosphate of from 2.5:1–2.03:1, practically only structural units corresponding to the formulae (8) and (13) may be obtained in the polyphosphate.

In the first case, this means that there are practically no aromatic diol phenolic OH groups in the polyphosphate (for example=0.2%, preferably=0.1% OH of aromatic diol).

In the second case, this means that there is practically the maximum quantity possible of aromatic diol phenolic groups in the polyphosphate. One or the other may be advantageous, depending on the purpose of use.

The polycondensation may be followed by continuously measuring the melt viscosity of the reaction medium.

The branched polyphosphates which may be used according to the present invention may be viscous or more or less plastic resins at 20° C. They then have glass transition temperatures of below 20° C. They may also preferably be rigid thermoplastic resins which have glass transition temperatures $T_g$ of above 20° C. Those having glass transition temperatures $T_g$ of above 40° C. are particularly preferred, and those having glass transition temperatures of above 60° C., particularly above 70° C., are most preferred.

The polyphosphates which are used in the present invention generally have apparent molecular weights $\overline{M}_w$ (measured by gel chromatography, with bisphenol A-polycarbonate as a control) of from 1,600 to 15,000, preferably from 2,300 to 50,000, more preferably from 3,200 to 25,000 and most preferably from 5,000 to 20,000.

The average polycondensation degrees $\overline{P}$ of the polyphosphates which are used generally range from 3 to 30, based on the phosphate groups in the polyphosphate. Polycondensation degrees $\overline{P}$ of from 4 to 25 are preferred, whereas polycondensation degrees of from 7 to 20 are particularly preferred.

The relative viscosity of the polyphosphates which are used generally ranges from 1.01–1.20, preferably from 1.02–1.18, and more preferably from 1.03–1.15 (measured in $CH_2Cl_2$, e=0.5 g/l).

Aromatic diols, on which the phosphate units corresponding to formulae (3) and (4) are based, and on which the radicals —R— may also be based, as long as this is not excluded in the preceding text, are the following, for example:
bis-(3,5-dimethylphenyl-4-hydroxyphenyl)-methane,
1,1-bis-(3,5-dimethylphenyl-4-hydroxyphenyl)-ethane,
2,2-bis-(3,5-dimethylphenyl-4-hydroxyphenyl)-propane,
2,2-bis-(3,5-dimethylphenyl-4-hydroxyphenyl)-butane,
2,4-bis-(3,5-dimethylphenyl-4-hydroxyphenyl)-2-methylbutane,
3,3-bis-(3,5-dimethylphenyl-4-hydroxyphenyl)-pentane,
1,1-bis-(3,5-dimethylphenyl-4-hydroxyphenyl)-cyclopentane,
1,1-bis-(3,5-dimethylphenyl-4-hydroxyphenyl)-cyclohexane,
bis-(3,5-dimethylphenyl-4-hydroxyphenyl),
bis-(3,5-dimethylphenyl-4-hydroxyphenyl)-sulphide, and
α,α'-bis-(3,5-dimethylphenyl-4-hydroxyphenyl)-p-diisopropylbenzene.

The following aromatic diols are preferred:
Bis-(3,5-dimethyl-4-hydroxyphenyl)-methane, and
2,2-bis-(3,5-dimethyl-4-hydroxyphenyl)-propane.

Of these, 2,2-bis-(3,5-dimethyl-4-hydroxyphenyl)-propane is particularly preferred.

Aromatic diols, on which the phosphate units corresponding to formulae (5) and (6) are based and on which the radicals —R— may generally also be based, as long as this is not excluded by the preceding text, include the following, for example:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
α,α'-bis-(4-hydroxyphenyl)-diisopropylbenzenes,
and nuclear-alkylated compounds thereof, as long as they do not fall within formula (1). These and other suitable aromatic diols corresponding to formual (2) are described in U.S. Pat. Nos. 3,028,365; 2,999,835; 3,148,172; 3,271,368; 2,991,273; 3,271,367; 3,780,087; 3,014,891; 2,999,846; in DE-OS Nos. 2,063,050; 2,211,957; 1,570,703; 2,329,585, and 2,329,686, in the monograph "Hermann Schnell, Chemistry and Physics of Polycarbonates, Polymer Reviews, Volume 9, Interscience Publishers New York, 1964" and in other places.

Of these aromatic diols, those are preferred which correspond to the formula (17):

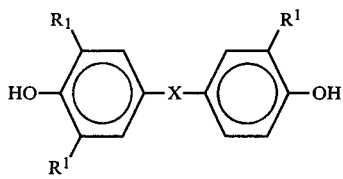

wherein
X is as defined in formula (3), and
$R^1$ represents H or $CH_3$, and which correspond to formula (18), 1,1,3,4,6-pentamethyl-3-(3,5-dimethyl-4-hydroxyphenyl)-indan-5-ol

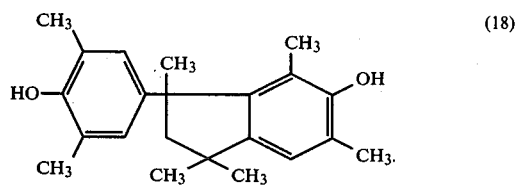

Such preferred aromatic diols corresponding to formula (17) include the following, for example:
2,2-bis-(4-hydroxyphenyl)-propane,
2,2-bis-(4-hydroxyphenyl)-butane,
2,4-bis-(4-hydroxyphenyl)-2-methylbutane,
1,1-bis-(4-hydroxyphenyl)-cyclohexane,
bis-(4-hydroxyphenyl),
bis-(4-hydroxyphenyl)-sulphide,
α,α'-bis-(4-hydroxyphenyl)-p-diisopropylbenzene,
2-(3-methyl-4-hydroxyphenyl)-2-(4-hydroxyphenyl)-propane,
2,2-bis-(3-methyl-4-hydroxyphenyl)-propane,
2-(3,5-dimethyl-4-hydroxyphenyl)-2-(4-hydroxyphenyl)-propane, and
2-(3-methyl-4-hydroxyphenyl)-2-(3,5-dimethyl-4-hydroxyphenyl)-propane.

Of the aromatic diols corresponding to formula (17), those are particularly preferred in which $R^1$ at least partly represents $CH_3$, but particularly if two methyl groups are in the ortho position to one phenolic OH group, and the aromatic diol corresponding to formula (18) is also particularly preferred.

The ratio of the structural units (3) and (4) to the structural units (5) and (6) in the polyphosphates which are used is at least 1:99 mol %, preferably at least 30:70 mol %, more preferably at least 60:40 mol % and most preferably at least 85:15 mol %, but in particular 100:0 mol %.

Polyphosphates which are based on crude bisphenols are most preferred, as they may be produced from pure 2,6-dimethylphenol and from commercial 2,6-dimethylphenols which are contaminated in particular with cresols, according to the processes of DE-OS Nos. 2,928,464 and 2,928,443.

The phosphoric acid esters which are required for the production of the polyphosphates which may be used according to the present invention correspond to the formula (19):

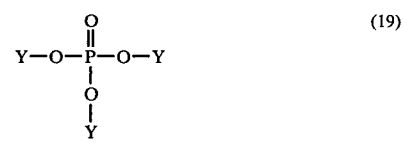

wherein
Y represents an alkyl-, cycloalkyl-, aryl- or aralkyl radical which may be the same or different.

The radicals Y may represent alkyl, including cycloalkyl, aryl and alkylaryl radicals which may be substituted, for example with halogen.

Examples of alkyl groups include the following: methyl, ethyl, propyl, butyl, pentyl, hexyl, heptyl, octyl, nonyl, decyl, undecyl, dodecyl and isomers thereof, for example neopentyl, 3,5,5-trimethylhexyl, 3-methylhexyl, 2-ethylhexyl, 2,5,5-trimethylhexyl, also cyclohexyl, 2-chloroethyl and 2,3-dibromopropyl.

Examples of aryl and alkylaryl radicals include phenyl, o, m, p-methylphenyl, 2,6-dimethylphenyl, 2,4-dimethylphenyl, 2,4,6-trimethylphenyl, 2- and 4-isopropylphenyl, nonylphenyl, 4-tert.-butylphenyl, 4-chlorophenyl, diphenyl, 2,4,6-trichlorophenyl, 4-bromophenyl, 2,4,6-tribromophenyl, naphthyl and benzyl.

Of the radicals Y which have been mentioned, the aryl radicals are preferred, in particular the halogen-free aryl radicals.

Of these, the phenyl, the o, m, p-methylphenyl and the 2,6-dimethylphenyl radicals are particularly preferred.

Phosphoric acid esters corresponding to formula (19) include the following, for example:
bis-(phenyl)-methylphosphate,
bis-(ethyl)-phenylphosphate,
bis-(ethyl)-2,6-dimethylphenylphosphate,
bis-(phenyl)-ethylphosphate,
tris-(2-chloroethyl)-phosphate,
bis-(phenyl)-2-chloroethylphosphate,
bis-(butyl)-phenylphosphate,
bis-(phenyl)-butylphosphate,
bis-(neopentyl)-phenylphosphate,
bis-(4-methylphenyl)-2-ethylhexylphosphate,
bis-(2-ethylhexyl)-phenylphosphate,
bis-(2-ethylhexyl)-4-methylphenylphosphate,
bis-(phenyl)-2-ethylhexylphosphate,
tris-(octyl)-phosphate,
bis-(phenyl)-octylphosphate,
bis-(octyl)-phenylphosphate,
bis-(3,5,5-trimethylhexyl)-phenylphosphate,
bis-(2,5,5-trimethylhexyl)-4-methylphenylphosphate,
bis-(phenyl)-isodecylphosphate,
bis-(dodecyl)-4-methylphenylphosphate,
bis-(dodecyl)-phenylphosphate,
tris-(phenyl)-phosphate,
tris-(2-methylphenyl)-phosphate,
tris-(4-methylphenyl)-phosphate,
bis-(2-methylphenyl)-phenylphosphate,
bis-(4-methylphenyl)-phenylphosphate,
bis-(phenyl)-2-methylphenylphosphate,
bis-(phenyl)-4-methylphenylphosphate,
tris-(isopropylphenyl)-phosphate,
bis-(isopropylphenyl)-phenylphosphate,
bis-(phenyl)-isopropylphenylphosphate,
tris-(nonylphenyl)-phosphate,
tris-(2,6-dimethylphenyl)-phosphate,
bis-(2,6-dimethylphenyl)-phenylphosphate,
bis-(phenyl)-2,6-dimethylphenylphosphate,
bis-(2,6-dimethylphenyl)-4-tert.-butylphenylphosphate,
bis-(2,6-dimethylphenyl)-4-methylphenylphosphate,
bis-(2,6-dimethylphenyl)-3-methylphenylphosphate,
bis-(2,6-dimethylphenyl)-4-isopropylphenylphosphate), and
bis-(2,6-dimethylphenyl)-2-isopropylphenylphosphate.

Triaryl esters are preferred phosphoric acid esters corresponding to formula (19). Phosphoric acid esters corresponding to formula (19) which are particularly preferred are triaryl esters having three identical aryl radicals or having at least two 2,6-dimethylphenyl radicals, such as
tris-(phenyl)-phosphate,
tris-(2-methylphenyl)-phosphate,
tris-(4-methylphenyl)-phosphate,
tris-(isopropylphenyl)-phosphate,
tris-(2,6-dimethylphenyl)-phosphate,
bis-(2,6-dimethylphenyl)-phenylphosphate,
bis-(2,6-dimethylphenyl)-2-methylphenylphosphate,
bis-(2,6-dimethylphenyl)-4-methylphenylphosphate, and
bis-(2,6-dimethylphenyl)-isopropylphenylphosphate.

Triphenylphosphate and tri-(2,6-dimethylphenyl)-phosphate are particularly preferred triaryl esters.

Basically acting organic or inorganic alkali and alkaline earth metal compounds are used as catalyst for the production of the polyphosphates which are used according to the present invention. Such compounds include the following, for example: metals, for example Li, Na, K, Ca; hydrides, such as LiH, NaH, KH, CaH$_2$; oxides such as Li$_2$O, Na$_2$O, K$_2$O, CaO, BaO, hydroxides such as LiOH, NaOH, KOH, Ba(OH)$_2$, Sr(OH)$_2$, Ca(OH)$_2$; alkali metal borohydrides, such as NaBH$_4$; amides of the alkali metals, such as Li-, Na- and K-amide, alkali and alkaline earth metal alcoholates, such as methylates, ethylates, propylates, butylates, cyclohexaneolates of Li, Na, K or Ca; phenolates, such as the Li-, Na-, K-salts of phenol, of o, m, p-cresol, of 2,6-dimethylphenyl, bis-alkali metal salts of aromatic dihydroxy compounds, such as the Li-, Na-, and K-salts of 2,2-bis-(4-hydroxyphenyl)-propane, or of 2,2-bis-(3,5-dimethyl-4-hydroxyphenyl)-propane.

The alkali metal compounds are preferred, and of these, the Na and K compounds are preferred. Of these, the hydroxides, alcoholates, phenolates and bis-phenolates are particularly preferred. Na phenolate is most preferred.

According to the present invention, compounds which contain only aromatically bound chlorine or bromine, which have decomposition temperatures of above 250° C. and which do not boil under normal pressure up to at least 300° C. are used as organic chlorine and/or bromine compounds.

Chlorine and bromine compounds which are preferably used include the following, for example:
(1) chlorinated and brominated diphenyls, such as octachlorodiphenyl, decachlorodiphenyl, octobromodiphenyl and decabromodiphenyl.
(2) Chlorinated and brominated diphenyl ethers, such as octa- and decachlorodiphenyl ether and octa- and decabromodiphenyl ether.
(3) Chlorinated and brominated phthalic acid anhydride and derivatives thereof, such as phthalimides and bisphthalimides, for example tetrachloro- and tetrabromophthalic acid anhydride, tetrachloro- and tetrabromophthalimide, N-methyltetrachloro- and N-methyltetrabromophthalimide, N,N'-ethylene bis-tetrachloro and N,N'-ethylene-bis-tetrabromophthalimide.
(4) Chlorinated and brominated bisphenols, such as 2,2-bis-(3,5-dichloro-4-hydroxyphenyl)-propane and 2,2-bis-(3,5-dibromo-4-hydroxyphenyl)-propane.
(5) 2,2-bis-(3,5-dichloro-4-hydroxyphenyl)-propane-oligocarbonate and 2,2-bis-(3,5-dibromo-4-hydroxyphenyl)-propane-oligocarbonate having an average polycondensation degree of from 2 to 20.
(6) Chlorinated and brominated polystyrenes.
(7) Chlorinated and brominated polyphenylene oxide.

The bromine compounds are preferred to the chlorine compounds. Of the bromine compounds, decabromodiphenyl ether, N,N'-ethylene-bis-tetrabromophthalimide and 2,2-bis-(3,5-dibromo-4-hydroxyphenyl)-propane-oligocarbonate are particularly preferred.

According to the present invention, standard polytetrafluoroethylene may be used, advantageously in a pulverulent, finely-divided form.

The flame-resistant polymer mixtures according to the present invention have a property spectrum which is advantageous to technology. Thus, they exhibit a high fire resistance, a low dropping tendency while burning and a high processing stability which may be recognized, for example, from the fact that the melt exhibits a low tendency to discolourations or to the release of gases which are reflected in the mouldings as discolourations and streaks. Furthermore, they exhibit a good flowability in the melt and high strengths of the mouldings on the joint lines. They also exhibit a good strength, a high surface quality of the mouldings and a low electrostatic charging ability. The thermal stability is to be stressed, even in the case of high quantities of polyphosphate.

These properties are conditioned to some extent by the fact that the polyphosphates which have been mentioned are compatible with the polycarbonates, styrene polymers and graft polymers which are used. Thus, for example, polyphosphates based on 2,2-bis-(3,5-dimethyl-4-hydroxphenyl)-propane are of a monophasic nature in admixture with the polycarbonate based on the same compound, and polystyrene or styrene-acrylonitrile copolymers.

The flame-resistant polymer mixtures of the present invention may be processed into mouldings, plates, films, fibres, coatings and others. They may be effectively used in mixtures with fillers and reinforcing materials, for example minerals and glass fibres, carbon black, dyes and pigments, stabilizers, lubricants and mould-release auxiliaries. They are particularly advantageous in areas where properties of flame resistance with a high thermal stability, hydrolysis stability, surface quality and electrical insulation are important. Thus, for example, they may advantageously be used for the production of component parts for electrically operated devices, such as housings or housing parts and insulators for current-carrying parts, or for the production of component parts in cars, such as coverings, dashboards, and component parts in the engine compartment.

EXAMPLES

EXAMPLE 1

Polymers and bromine compounds which are used (a) MPC 2,2-bis-(3,5-dimethyl-4-hydroxyphenyl)-propane-polycarbonate $\eta rel = 1.301$ (in $CH_2Cl_2$, $c = 5$ g/l), glass transition temperature $T_g = 203°$ C. (measured by differential thermo-analysis).

(b) MPC I

Polycarbonate as for MPC, but $\eta rel = 1.61$ (in $CH_2Cl_2, c = 5$ g/l), glass transition temperature $T_g = 206°$ C., was mixed with MPO via a chlorobenzene solution for Example 5 and obtained as MPC I/MPO mixture by an evaporation extrusion.

(c) MPC-CRUDE

Polycarbonate from a crude bisphenol with 95% by weight of 2,2-bis-(3,5-dimethyl-4-hydroxyphenyl)-propane, less than 0.1% by weight of 2,6-dimethylphenol and 4.9% by weight of unspecified components (crude bisphenol obtained according to DE-OS 2,928,464, Example 1), $\eta rel = 1.298$ (in $CH_2Cl_2$, $c = 5$ g/l), glass transition temperature $T_g = 202°$ C.

(d) HIPS (High impact polystyrene)

Emulsion graft polymer of 35% by weight of polybutadiene with 65% by weight of polystyrene.

(e) ABS

Emulsion graft polymer of 25% by weight of polybutadiene with 75% by weight of styrene-acrylonitrile copolymer, 90:10 parts by weight.

(f) ACRYLATE

Graft polymer having a core-sheath structure of the following composition: m-butyl acrylate:butanediol-1,3-diacrylate:diallyl maleate:methyl methacrylate = 79.2:0.4:0.4:20.0.

(g) SMA

Styrene-maleic acid anhydride copolymer, 89:11 parts by weight, glass transition temperature $T_g = 128°$ C.

(h) PST

Polystyrene, glass transition temperature $T_g = 101°$ C.

(i) SAN

Styrene-acrylonitrile copolymer, 90:10% by weight, glass transition temperature $T_g = 107°$ C.

(j) PTFE

Polytetrafluoroethylene.

(k) MPO 2,2-bis-(3,5-dimethyl-4-hydroxyphenyl)-propane-polyphosphate, produced from 2,2-bis-(3,5-dimethyl-4-hydroxyphenyl)-propane and triphenylphosphate (ratio 0.91:1) with Na-phenolate as catalyst), $\eta rel = 1.07$ (in $CH_2Cl_2$, $c = 5$ g/l), glass transition temperature $T_g = 84°$ C.

(l) MPO I bis-(3,5-dimethyl-4-hydroxyphenyl)-methane-polyphosphate, produced as for MPO, $\eta rel = 1.08$ (in $CH_2Cl_2$, 5 g/l), glass transition temperature $T_g = 71°$ C.

(m) MPO II

Copolyphosphate of 70 mol % of 1,1,3,4,6-pentamethyl-3-(3,5-dimethyl-4-hydroxyphenyl)-indan-5-ol and 30 mol % of 2,2-bis-(3,5-dimethyl-4-hydroxyphenyl)-propane, produced as for MPO, $\eta rel = 1.09$ (in $CH_2Cl_2$, 5 g/l), glass transition temperature $T_g = 115°$ C.

(n) DBDPE

Decabromodiphenylether

EXAMPLES 2-6

Flame-resistant polymer mixtures

The polymer alloys which are stated in the Table under Examples 2 to 6 were produced by a double shaft extruder at a melt temperature of from 260° to 300° C. As may be seen from the Table, flame-resistant alloys are obtained.

TABLE

Examples 2-6: Flame-resistant polymer mixtures

| Ex. | Mixture components (see Ex.1) in % by weight | Properties of the alloys | | | | | | |
|---|---|---|---|---|---|---|---|---|
| | | UL | $a_k$ | $a_n$ | $a_{nF}$ | Vicat B (°C.) | Processing stability | Hydrolysis NaOH 10% |
| 2 | MPC:HIPS:MPO:DBDPE:PTFE 29.9:44.9:15.0:10.0:0.2 | VO | 8 | nb | 5 | 111 | >300 | n |

TABLE-continued

Examples 2-6: Flame-resistant polymer mixtures

| Ex. | Mixture components (see Ex.1) in % by weight | UL | $a_k$ | $a_n$ | $a_{nF}$ | Vicat B (°C.) | Processing stability | Hydrolysis NaOH 10% |
|---|---|---|---|---|---|---|---|---|
| 3 | MPC:HIPS:MPO:DBDPE:PTFE 47.9:31.9:10.0:10.0:0.2 | VO | 8 | nb | 5 | 133 | >300 | n |
| 4 | MPC-CRUDE HIPS MPO DBDPE PTFE 60.8:26.0:5.0:8.0:0.2 | VO | 9 | nb | 5 | 152 | >300 | n |
| 5 | MPC:ABS:MPO:DBDPE:PTFE 47.9:31.9:10.0:10.0:0.2 | VO | 10 | nb | 8 | 139 | >300 | n |
| 6 | MPCI:ACRYLATE:MPO:PTFE 59.9:10.0:29.9:0.2 | VO | 7 | 80-nb | 5 | 156 | >300 | n |

UL = Flame resistance according to UL Subj. 94, test rods 1/8 and 1/16"; $a_k$ = notched impact strength (KJ/m$^2$) according to DIN 53453; $a_n$ = impact resistance (kJ/m$^2$) according to DIN 53453; $a_{nF}$ = joint line strength = impact resistance $a_n$ on test bodies injected on both sides having a merging joint line in the centre; Vicat B = thermal stability according to Vicat method B (DIN 53460); hydrolysis in 10% aqueous NaOH at 100° C. over a period of 400 hours; nb = not broken; n = not attacked.

EXAMPLES 7 TO 13

Compatibility of the polyphosphates with polystyrene resins and MPC

The results of the compatibility tests in the Table for Example 7 to 13 show that the polyphosphates which are used according to the present invention for the production of the flame-resistant polymer mixtures are compatible with polystyrene resins and with polycarbonate, and they produce monophasic polymer mixtures.

TABLE

Examples 7-13 Compatibility MPO, MPC, PST resins

| Ex. | Components | % by weight | Glass transition temperature $T_g$ (°C.) | Appearance |
|---|---|---|---|---|
| 7 | MPC:MPO | 70:30 | 166 | transparent |
| 8 | MPC:MPO I | 70:30 | 162 | " |
| 9 | MPC:MPO II | 70:30 | 175 | " |
| 10 | MPO:PST | 30:70 | 94 | " |
| 11 | MPO:SMA | 30:70 | 114 | " |
| 12 | MPO:SAN | 30:70 | 100 | " |
| 13 | MPC:PST:MPO | 40:30:30 | 134 | " |

The mixtures were obtained as films from the CH$_2$Cl$_2$ solution of the components. The films were dried at 80° C. under vacuum for several days. The monophasic nature of the mixtures was verified by the presence in each case of only one glass transition temperature and by the transparency of the films. $T_g$ was measured by differential thermoanalysis.

We claim:

1. Flame-resistant polymer mixtures, characterized in that they contain (a) from 5 to 94% by weight of a polycarbonate, the linear chains of which consist of at least 85 mol % of recurring structural units corresponding to formula (1):

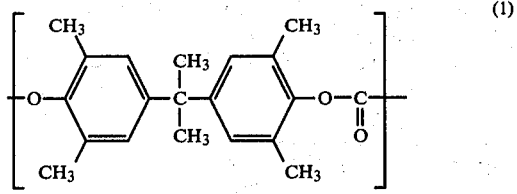
(1)

and
at most 15 mol % of recurring units corresponding to formula (2):

$$[O-R-O-\underset{\underset{O}{\|}}{C}] \quad (2)$$

wherein
—R— represents an o-, m- or p-phenylene radical or a radical of the formula (2a)

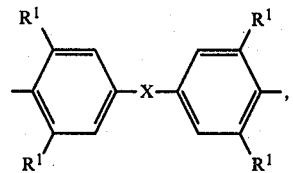
(2a)

wherein
R$^1$ represents hydrogen, halogen such as chlorine or bromine and C$_1$–C$_3$-alkyl and
X represents a C$_1$–C$_5$alkylene- or alkylidene radical, a C$_3$–C$_6$ cycloalkylene or cycloalkylidene radical, a single bond, —S— or a radical of the formula (2b),

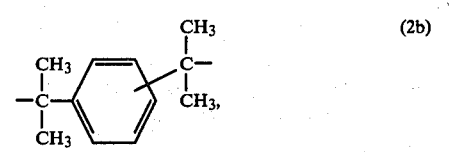
(2b)

in which the two alkyl-substituents can have o-, m- or -position to each other, or represents a radical of the formula (2c)

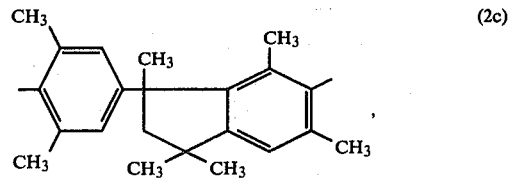
(2c)

whereby units of the formula (1) are not comprised, (b) from 94 to 5% by weight of a styrene polymer and/or a graft polymer (c) from 1 to 35% by weight of a branched polyphosphate which consists of at least 1 mol % of recurring structural units corresponding to formula (3):

and/or to formula (4):

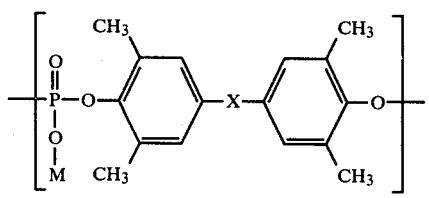
(3)

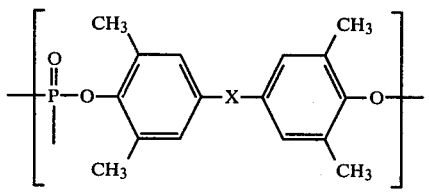
(4)

wherein

X represents a $C_1$–$C_5$ alkylene or alkylidene radical, a $C_5$–$C_6$ cycloalkylene or cycloalkylidene radical, a single bond, —S— or

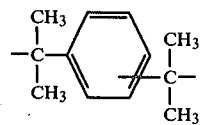

and

M represents H, alkali metal or ½ alkaline earth metal, Y or —R—OH wherein

Y represents an alkyl-, aryl-, cycloalkyl- or aralkyl-radical, and

R is as defined above, and at most 99 mol % of recurring structural units corresponding to formulae (5) and/or (6):

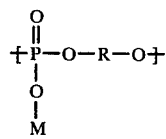
(5)

(6)

wherein

R and M are as defined above, but not including units corresponding to formulae (3) and (4), (d) from 0 to 20% by weight of one or more organic chloride and/or bromine compounds which contain only aromatically bound chloride and/or bromine, have a decomposition temperature of above 250° C. and do not boil under normal pressure up to at least 300° C., (e) from 0 to 1% by weight of polytetrafluoroethylene.

* * * * *